United States Patent [19]

Ryckman, Jr. et al.

[11] 4,155,291
[45] May 22, 1979

[54] CONTROL SYSTEM FOR AUTOMATIC COFFEE BREWING MACHINES

[75] Inventors: William D. Ryckman, Jr.; Charles L. Kemp, both of Asheboro, N.C.

[73] Assignee: General Electric Company, New York, N.Y.

[21] Appl. No.: 938,030

[22] Filed: Aug. 30, 1978

[51] Int. Cl.² ............... A47J 31/46; A47J 31/56; H05B 1/00
[52] U.S. Cl. .................. 99/282; 99/283; 219/441; 219/446
[58] Field of Search ............ 99/280, 281, 282, 283, 99/288, 300, 307; 219/441, 446, 296

[56] References Cited

U.S. PATENT DOCUMENTS

| | | | |
|---|---|---|---|
| 3,405,630 | 10/1968 | Weber | 99/282 |
| 3,513,767 | 5/1970 | Bloomfield | 99/282 |
| 3,987,717 | 10/1976 | Bergmann | 99/280 |
| 4,069,750 | 1/1978 | Kemp | 99/280 |
| 4,100,394 | 7/1978 | Tilp | 99/281 |

Primary Examiner—Robert W. Jenkins
Attorney, Agent, or Firm—George R. Powers; Leonard J. Platt; John F. Cullen

[57] ABSTRACT

An automatic coffee brewing machine is provided with a heater for heating the pump apparatus for forcing water therethrough, thermostatic switch means associated with the pump apparatus for sensing the completion of the brewing cycle, and circuit means including the switch means effective upon completion of the brewing cycle for changing the power output of the heater from the high level required for brewing operation to a much lower level required to prevent reinitiation of the brewing cycle. A heating unit for a carafe holding brewed coffee has heating means associated with the circuit means for producing heat both during and after the brewing cycle, the heat produced during the brewing cycle being greater than that produced after the brewing cycle.

3 Claims, 5 Drawing Figures

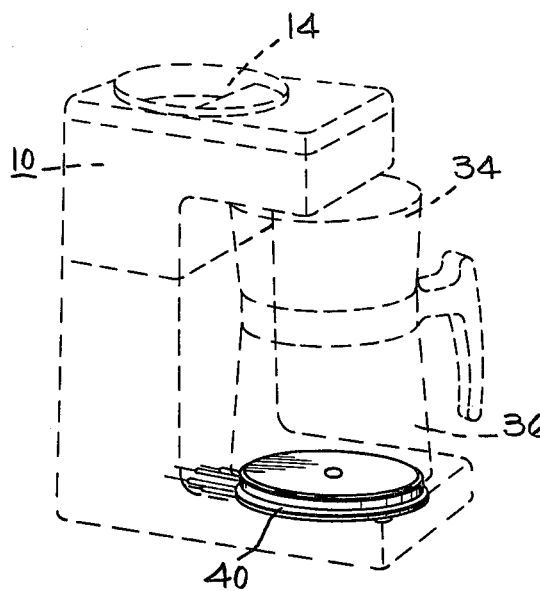
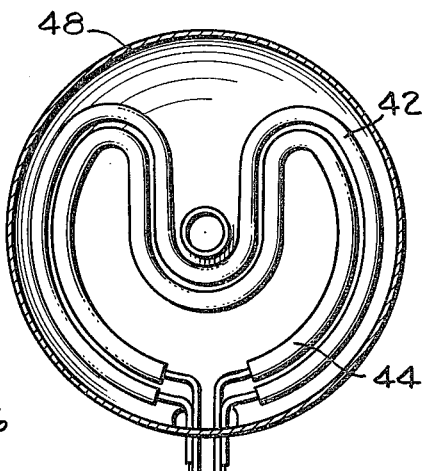
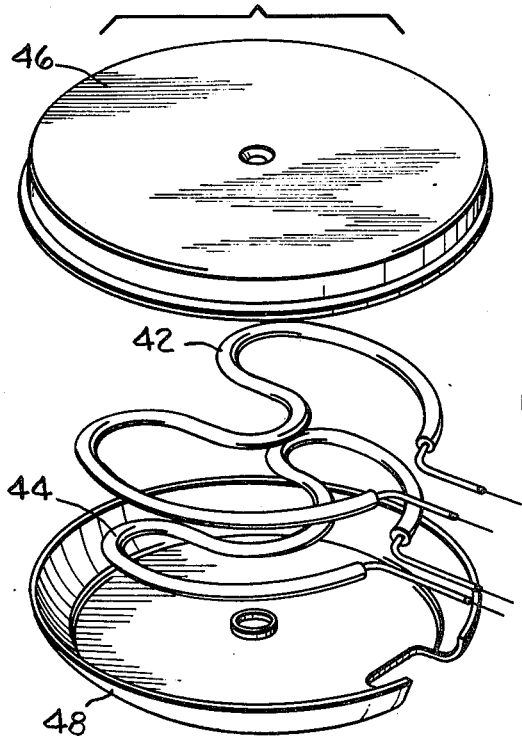
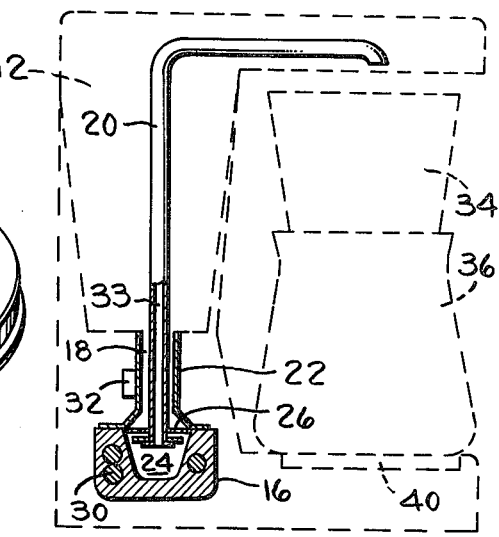
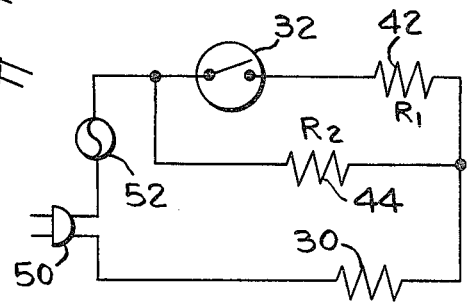

CONTROL SYSTEM FOR AUTOMATIC COFFEE BREWING MACHINES

BACKGROUND OF THE INVENTION

1. Field of the Invention

This invention relates to automatic coffee-brewing machines and, more particularly, to an improved heating and control system for such systems.

2. Description of the Prior Art

In coffee brewing machines such as percolators and, particularly, drip coffeemakers having a hot water pump apparatus, it has long been the practice to sense the temperature of the pump apparatus, and the water therein, and disconnect the pump heater as soon as a predetermined temperature has been reached. At this point the brewing operation is complete. Since this sensing and switching is normally done by means of a thermostatic switch closely associated with the heater, subsequent cooling of the pump assembly could cause the heater to be reenergized again. To prevent such an occurrence, it has been common to provide another heater for maintaining, upon completion of the brewing cycle, the pump assembly at a temperature high enough to prevent reinitiation of the brewing cycle. It has also been common in the prior art to provide a separate heater for maintaining the brewed coffee at serving temperature following completion of the brewing cycle. In drip coffeemakers, these "keep warm" heaters typically heat the coffee carafe at a relatively low energy level both during and subsequent to the brewing cycle. These arrangements have not been altogether satisfactory in that the initial heat output when starting with a cold carafe may not be sufficient to prevent undue cooling of the coffee.

SUMMARY OF THE INVENTION

It is therefore a primary object of this invention to provide for coffee brewing machines an improved heating and control system not requiring separate pump and thermostat heaters.

Another object is to provide improved means for heating the coffee-storing carafe both during and after the brewing cycle.

Yet another object of the invention is to provide heating means for the coffee-storing carafe that has a higher heat output during the brewing cycle than it has following the brewing cycle.

Briefly stated, in carrying out the invention in one form, an automatic coffee-brewing machine of the type having a container for receiving cold water at the start of the brewing operation, a carafe for receiving brewed coffee at the end of the brewing operation, a pump assembly for forcing water between the container and the carafe, and a warming unit for receiving the carafe has a first heater associated with the pump assembly. The warming unit has second and third heaters associated therewith. An thermostatic switch means is provided in heat exchange relation with the pump assembly for sensing the temperature of the pump assembly and, indirectly, any water therein. The switch means has a closed position and an open position, and the switch means is actuated to its closed position whenever the sensed temperature is below a first predetermined level and is actuated to its open position whenever the sensed temperature is above a second higher predetermined level. The switch means and the first, second and third heaters are interconnected by circuit means such that at least a circuit consisting of the first and second heaters is connected in series across a source of electric power when the switch means is in its closed position and such that only a circuit consisting of the first and third heaters is connected in series across the source when the switch means is in its open position.

By a further aspect of the invention, the resistances of said first, second and third heaters are selected such that during the brewing operation the heat produced by the first heater is sufficient to pump water through the pump assembly without actuating the switch means to its open position and the heat produced by said second and third heaters is sufficient to heat the carafe and maintain coffee therein warm. Upon completion of the brewing operation, the resistances of the heaters are such that the heat produced by the first heater is sufficient to heat the pump assembly to a temperature above the second predetermined level to actuate the switch means to its open position. Thereafter, the resistances of the first and third heaters are such that the heat produced by the first heater is sufficient to maintain the switch means in its open position and the heat produced by the third heater is sufficient to maintain the carafe and coffee therein warm.

By a further aspect of the invention, the resistance of the third heater is substantially greater than the resistance of the first heater, and the resistance of the first heater is substantially greater than the resistance of the second heater. By a still further aspect of the invention, the resistances of the heaters are selected such that the heat produced by the second and third heaters when the switch means is actuated to its closed position is greater than the heat produced by the third heater when the switch means is actuated to its open position.

BRIEF DESCRIPTION OF THE DRAWING

While the novel features of the invention are set forth with particularity in the appended claims, the invention, both as to organization and content, will be better understood and appreciated, along with other objects and features thereof, from the following detailed description taken in connection with the drawings, in which:

FIG. 1 is a perspective view of a coffeemaker incorporating the heating and control system of this invention;

FIG. 2 is a cross-sectional view of the coffeemaker of FIG. 1 showing the pump and the pump heater;

FIG. 3 is an exploded view of the warming unit of the coffeemaker of FIG. 1;

FIG. 4 is top view of the warming unit of the coffeemaker of FIG. 1 with the top cover removed; and FIG. 5 is a schematic diagram showing the electric circuit of the coffeemaker of FIG. 1.

DETAILED DESCRIPTION

Referring first to FIGS. 1 and 2, a coffeemaker 10 incorporating the heating and control system of this invention is illustrated. The coffeemaker, or coffee brewing machine, includes a container 12 for receiving cold water through a fill opening 14 prior to initiation of the brewing cycle. The bottom of the container 12 communicates with a pump assembly 16 through a passage 18 formed between concentric inner and outer tubes 20 and 22, which form a portion of the pump assembly 16. At its lower end, the passage 18 communicates with a pump chamber 24 through a valve assembly 26. A first heater 30 is coiled about the outside of the pump chamber 24 to heat the assembly and water contained therein.

A thermostatic switch assembly 32 is connected to the exterior of tube 22 of the pump assembly 16 for sensing the pump assembly temperature. From the pump chamber 24, a passage 33 within the inner tube 20 leads to a coffee brewing basket 34, from which brewed coffee is discharged into a carafe 36. The carafe 36, which supports the basket 34, is positioned upon a warming unit 40.

As best illustrated by FIGS. 3 and 4, the warming unit 40 includes a pair of heaters 42 and 44 positioned between upper cover 46 and lower cover 48, at least the upper cover 46 being formed of heat conducting material for conducting heat to a carafe positioned thereon.

Referring now to FIGS. 2 and 5, the heaters 30, 42 and 44 and the thermostatic switch 32 are interconnected by circuit means in the manner illustrated. As shown, the first heater 30 associated with the pump assembly 16 is connected in a first series circuit with both the second heater 42 and the switch 32 across a source of electric power when the plug 50 is plugged into an appropriate terminal, element 52 being a fuse for providing an open circuit in the event of excessive temperature. The first heater 30 is also connected in a second series circuit with the third heater 44 across the source of electric power when the plug 50 is plugged in.

With reference now to FIGS. 2 and 5, the switch 32, which may conveniently have temperature sensitive switch elements such as bimetallic switch blades, the temperature it senses is below a first predetermined level and are opened whenever its temperature is above a second predetermined higher level. These temperatures are determined based on the operating characteristics of the coffeemaker 10. More particularly, the first temperature level is substantially above ambient room temperature. The second temperature level is significantly above the operating temperature of the pump assembly 16 when water is being pumped therethrough, but below the level to which the heater 30 heats the pump assembly 16 after all water has flowed therefrom to the brewing coffee basket 34.

Also in accordance with the invention, the resistance of the third heater 44 is substantially greater than the resistance of the first heater 30 and the resistance of the first heater 30 is substantially greater than the resistance of the second heater 42.

In a selected embodiment of the invention, the first and second predetermined temperatures at which the thermostatic switch 32 changes between its operative positions are approximately 60° C. and 91° C. The resistances of the first heater 30, the second heater 42 and the third heater 44 are 21.82 ohms, 3 ohms, and 207 ohms, respectively.

The operation of the coffeemaker 10 in accordance with the invention will now be described. Upon placing water in the container 16 and plugging in the plug 50, the switch 32 will be in its closed position since the pump assembly temperature is below the first predetermined level. Under these circumstances, with the plug 50 connected to a 120-volt supply of AC current, the heater 30 produces approximately 512 watts and the heaters 42 and 44 together produce approximately 70 watts (virtually all of the 70 watts being supplied by the second heater 42 because of the relative resistances). The water flowing down the passage 18 from the container 12 is heated by the heater 30 within the chamber 24 and is expelled as a slug of heated water and steam through the passage 33 to the coffee brewing basket 34, reverse flow back to the container 12 being prevented by the valve assembly 26. More water then enters the chamber 24, and the process is continued until all water has passed through the chamber 24.

So long as water is passing through the chamber 24, the temperature sensed by the switch 32 will remain below the second higher predetermined temperature due to the cooling action of the water flowing within the tube 22. Upon the passage of the last of the water, however, the temperature of the pump assembly 16 as sensed by the thermostatic switch 32 will soon exceed the second higher level, and the switch 32 will be actuated to its open position. When this occurs, heater 42 is removed from the circuit, and the remaining current will flow through the second series circuit comprising the first heater 30 and the third heater 44. Under these conditions, the heater 44 will produce approximately 57 watts. The six watts produced by the heater 30 under this condition is sufficient to maintain the pump assembly 16 above the first temperature level, thereby maintaining the switch 32 in its open position and preventing unintentional reinitiation of the brewing cycle.

In accordance with the invention, the warming unit 40 is supplied with approximately 70 watts heat input during the brewing operation. This has been found to be sufficient to not only keep coffee supplied to the carafe warm, but also to heat the initially cool carafe. Upon completion of the brewing cycle, the heat input to the warming unit 40 drops to approximately 57 watts, which is sufficient to keep the carafe and coffee therein warm without wasting power or overheating the coffee.

It will, of course, be obvious to those skilled in the art that the actual values recited herein are illustrative only. In fact, they are applicable to a particular four cup coffeemaker. Other coffeemakers, particularly those over four cups, would require other values within the framework of the invention.

During brewing operation, it is essential that the first series circuit consisting of heaters 30 and 42 be energized. During the brewing operation, it makes no real difference as to whether or not the second series circuit consisting of heaters 30 and 44 is energized in view of the high resistance of heater 44. Following the brewing operation, however, it is essential that the switch 32 be opened to deenergize the first circuit consisting of heaters 30 and 42. In other words, during the brewing operation, it is essential that at least the first circuit be energized. Of the first and second circuits, it is essential upon completion of the brewing cycle that only the second circuit be energized.

It will thus be seen that this invention provides a unique coffeemaker control circuit that both requires only a single heater for the pump assembly and provides higher heat input to the coffee-storing carafe during the brewing operation than is provided following the brewing cycle.

While the invention has been particularly shown and described with reference to a preferred embodiment thereof, it will be understood by those skilled in the art that various changes in form details and application may be made therein without departing from the spirit and scope of the invention. For example, it would be possible to modify the thermostatic switching means to open the circuit consisting of heaters 30 and 44 during the brewing operation and to close the circuit following the brewing operation. It is, of course, intended to cover all such modifications and changes by the appended claims.

What is claimed is new and is desired to secure by letters patent of the United States is:

1. In an automatic coffee brewing machine of the type having a container for receiving cold water at the start of a brewing operation, a carafe for receiving brewed coffee at the end of the brewing operation, a pump assembly for forcing water between the container and the carafe, and a warming unit for receiving the carafe for keeping coffee therein hot, an improved heating and control system comprising:

a first heater in heat transfer relation with the pump assembly for heating water therein, second and third heaters for supplying heat to the warming unit, thermostatic switch means in heat transfer relation with said pump assembly for sensing the temperature of said pump assembly, said switch means having a closed position and an open position and being actuated to said closed position whenever the sensed temperature is below a first predetermined level and being actuated to said open position whenever the sensed temperature is above a second higher predetermined level, circuit means for interconnecting said first, second and third heaters and said switch means across a source of electric power such that at least a circuit consisting of said first and second heaters is connected in series across the source when said switch means is in its closed position and such that only a circuit consisting of said first and third heaters is connected in series across the source when said switch means is in its open position, the resistances of said first, second and third heaters being selected such that during the brewing operation the heat produced by said first heater is sufficient to pump water through the pump assembly without actuating said switch means to its open position and the heat produced by said second and third heaters is sufficient to heat said carafe and maintain coffee therein warm, and such that upon completion of the brewing operation the heat produced by said first heater is sufficient to heat the pump assembly to a temperature above the second predetermined level and thereby activate said switch means to its open position; and the resistances of said first and third heaters being selected such that when the switch means has been actuated to its open position the heat produced by said first heater is sufficient to maintain said switch means in and the heat produced by said third heater is sufficient to maintain the carafe and coffee therein warm, whereby said first heater prevents the machine from recycling following completion of the brewing operation.

2. A heating and control system as defined by claim 1 in which the resistance of said third heater is substantially greater than the resistance of said first heater and in which the resistance of said first heater is substantially greater than the resistance of said second heater.

3. A heating and control system as defined by claim 2 in which the resistance of said first, second and third heaters are selected such that the heat produced by said second and third heaters when said switch means is actuated to its closed position is greater than the heat produced by said third heater when said switch means is actuated to its open position.

* * * * *